June 7, 1960  S. DABICH ET AL  2,939,557
TRANSMISSION MECHANISM
Filed Nov. 7, 1955  2 Sheets-Sheet 2

PUMP REGULATOR VALVE

Inventors:
Sam Dabich and
John B. Polomski
By:
Keith J. Bleuer Atty.

United States Patent Office

2,939,557
Patented June 7, 1960

2,939,557
TRANSMISSION MECHANISM

Sam Dabich and John B. Polomski, Detroit, Mich., assignors to Borg-Warner Corporation, a corporation of Illinois Filed Nov. 7, 1955, Ser. No. 545,151

8 Claims. (Cl. 192—3.5)

This invention relates to transmission mechanisms for automotive vehicles, and more particularly to automatic power actuated means for engaging a clutch in an internal combustion engine installation for such a vehicle.

In the past several years the trend in the automotive industries has been toward semi-automatic and fully automatic transmissions. In most cases the automatic transmissions are quite different from conventional countershaft transmissions which were used in most automobiles in the past years and still are used in a great many automobiles. Although automatic transmissions make the driving of an automotive vehicle substantially easier and have met with widespread acceptance, such transmissions are much more expensive to produce than the conventional countershaft transmissions, partly because of the more complicated construction including complicated hydraulic control systems. In addition, somewhat more engine power is absorbed by an automatic transmission through the automatic engaging devices and the more complicated gearing arrangements, an important factor to be considered with low-powered vehicles.

The clutch control system of the present invention is intended to incorporate most of the advantages of an automatic transmission while utilizing a conventional countershaft transmission in connection with a power actuated clutch, and includes a hydraulic control system for providing the power to actuate the clutch. The system is arranged so that the clutch will be disengaged when the countershaft transmission is conditioned for a gear shift and when the vehicle is in its neutral condition. Means in the hydraulic system are provided for supplying a relatively low fluid pressure for beginning the clutch engagement and for supplying a relatively high fluid pressure for locking the clutch in engagement. The transmission can be manually shifted into the higher gear ratios without the necessity for manually disengaging the clutch, so that the usual clutch pedal is eliminated. In addition, means are provided to insure the disengagement of the clutch before the gears in the countershaft transmission can be shifted, thus preventing undesirable effects in the countershaft transmission.

It is therefore an object of this invention to provide an improved automatic clutch control arrangement.

Another object of this invention is to provide a system for controlling clutch engagement for a conventional countershaft vehicle transmission.

A still further object of the invention is to provide improved automatic controls for a hydraulic power actuated clutch in an automotive vehicle under the control of the shift lever for a vehicle countershaft transmission including a hydraulic control system providing a relatively low fluid pressure for beginning the clutch engagement and for supplying a relatively high fluid pressure for locking the clutch in engagement.

Another object of this invention is to provide means associated with the shift lever of the countershaft transmission to allow full clutch disengagement in advance of a gear shift in the transmission.

It is contemplated by this invention that the electrical system of the vehicle be associated with a hydraulic clutch operating system, so that clutch engaging and disengaging means is electrically controlled. Therefore, another object of this invention is to provide a hydraulic clutch control system associated with electrically operated means for operating the clutch control system.

In addition, this invention provides means for starting the vehicle engine when the vehicle battery is in a run-down condition, including a manually operated second clutch in parallel with the power operated clutch. Therefore, a still further object of this invention is to provide a vehicle having a power operated clutch associated with a conventional countershaft transmission with a second clutch in parallel to the power operated clutch for push-starting the vehicle.

These and other objects and features of this invention will become apparent when taken with the accompanying drawings, in which.

Figure 1:
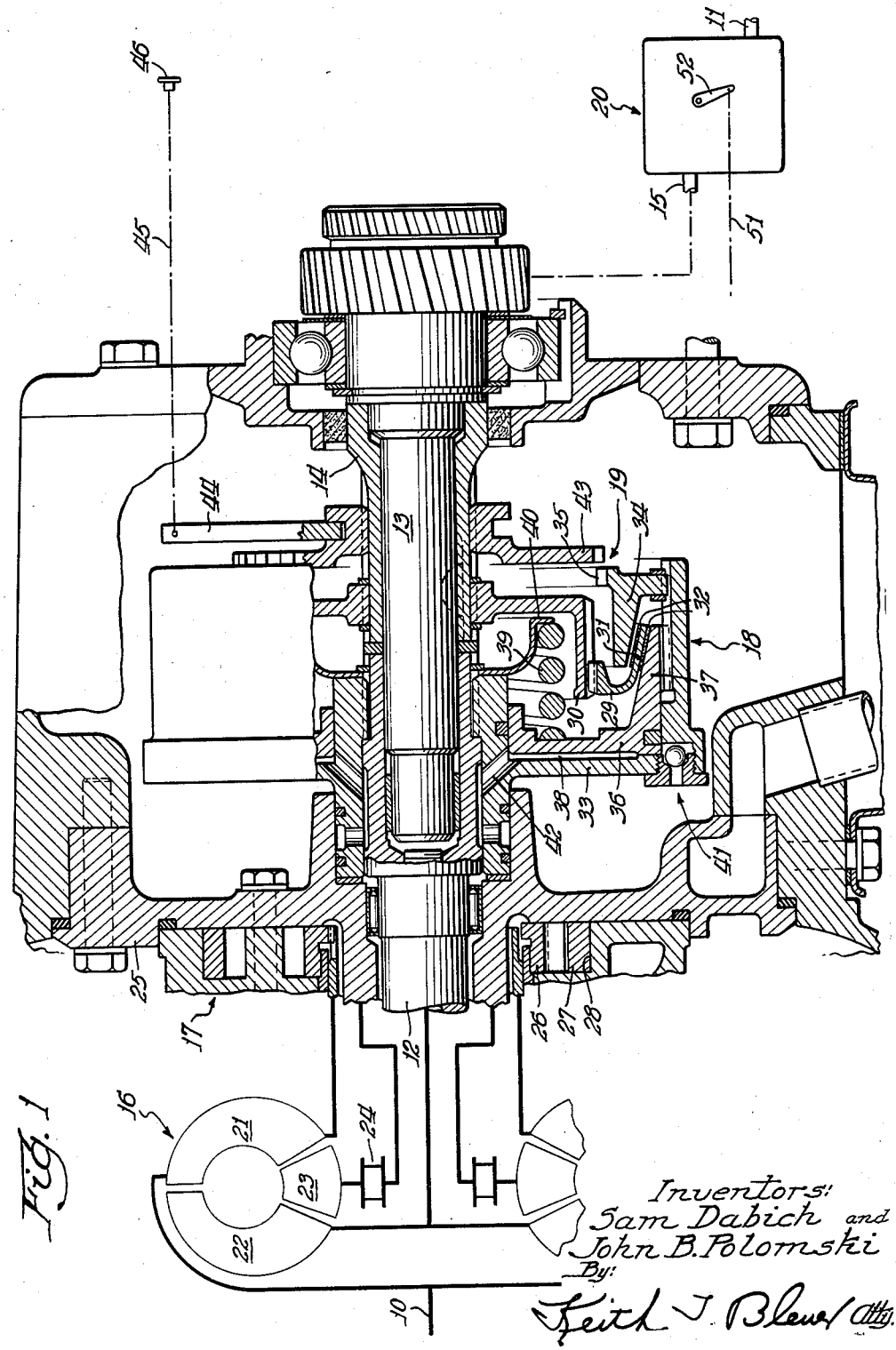
Figure 1 is a partial sectional view, with some parts shown schematically, of a transmission constructed in accordance with this invention.

Referring now to Figure 1 of the drawings, there is illustrated a transmission comprising an input shaft 10, a driven shaft 11, a first intermediate shaft 12, a second intermediate shaft 13, a sleeve shaft 14 and a countershaft 15. The input shaft 10 is driven by the vehicle engine and the output shaft 11 is arranged, through suitable means, to drive the road wheels of the vehicle. The transmission also includes a hydraulic torque converter, generally indicated at 16, a fluid pump 17, a friction cone-type clutch 18, a spline-type clutch 19 and a countershaft transmission, generally indicated at 20.

The hydraulic torque converter 16 comprises a bladed impeller element 21 connected to be driven by the input shaft 10, a bladed turbine element 22, fixed with respect to the first intermediate shaft 12, and a bladed stator element 23. The torque converter is constructed in accordance with well-known practice with the blades of the element 21, 22 and 23 disposed in a common fluid circuit, so that when the impeller element 21 is driven the turbine element is driven by means of the fluid which is circulated by rotation of the impeller element, and the stator element 23 functions to change the direction of flow of the fluid, so that the turbine element is driven by a greater torque than is impressed on the impeller 21.

A one-way free wheeling brake 24 of well-known sprag or roller construction is provided between the stator element 23 and the casing 25 of the transmission. The brake 24 is so arranged to prevent rotation of the stator element 23 in a direction which is reversed to that of the drive or input shaft 10.

As is well-known with converters of this type, when the rotation of the turbine elements increases to a certain speed, the reaction of the fluid on the stator element reverses, thus tending to rotate the stator element in the forward direction and the one-way brake releases. Thereafter, the unit 16 functions as a simple fluid coupling driving the turbine element at no increase in torque.

The fluid pump 17 may be of any well-known construction, and as illustrated comprises an internal gear 26 connected to be driven by the input shaft 10 through the impeller 21, and an external gear 27, the gears being received in a cavity 28 in the transmission mechanism housing 25, the bottom of which housing forms a fluid sump. The pump supplies fluid under pressure to the torque converter 16 and to a hydraulic control circuit to be described.

The clutch 18 is adapted to couple together the first intermediate shaft 12, which is driven by the impeller 21, and the second intermediate shaft 13 by means of the sleeve shaft 14 keyed or otherwise fixed with respect to the shaft 13, which through suitable gearing, drives the countershaft 15. This clutch is of the cone-friction-type and comprises a clutch disc 29 which is splined to the periphery of a drum-like member 30 splined to the sleeve shaft, which as heretofore stated is fixed with respect to the shaft 13. The disc 29 is bent on an intermediate circumference to form a cone portion 31 which is provided with friction facings 32. A drum-like member 33 is splined to the first intermediate shaft 12, and an enlarged cone-shaped member 34 is fixed within the drum 33, the cone-shaped member 34 forming a fixed pressure plate for the cone portion 31 of the clutch plate 29. The cone-shaped member 34 is provided with an internally splined circular portion 35 for a purpose to be described. A piston 36 is provided with a second cone portion 37 adapted to engage the other face of the disc portion 31. The piston 36 is annular and fits within the drum-shaped member 33 and is splined to the interior of the drum-shaped member for sliding movement. A fluid cavity 38 is provided between the piston member 36 and the drum-shaped member 33 for receiving fluid pressure to engage the friction clutch 18. A spring 39 is disposed between the piston member 36 and a spring retainer 40 fixed with respect to the first intermediate shaft 12 for causing disengagement of the friction clutch 18 when fluid pressure is not supplied to the fluid chamber 38. A suitable check valve 41 is provided in the wall of the fluid chamber 38 to prevent the centrifugal build-up of fluid pressure in the chamber and to relieve residual fluid in the chamber when fluid pressure is no longer supplied thereto for engaging the clutch 18. Fluid pressure to engage the friction clutch 18 is supplied to the cavity 38 through a conduit 42, which conduit is supplied with fluid by the hydraulic control circuit to be described.

The clutch 19 is in parallel with the clutch 18 and is adapted to connect the first intermediate shaft 12 and the second intermediate shaft 13 together when there is no fluid pressure available for engaging the friction clutch 18, as when the vehicle engine is not operating and when it is desired to start the vehicle by pushing it, and this clutch 19 will hereinafter be referred to as the push-start clutch. The clutch 19 comprises the internally splined member 34 of the clutch 18 and an externally splined cylindrical member 43, which is also splined for sliding movement to the sleeve shaft 14 fixed with respect to the second intermediate shaft 13. For engaging the clutch 19, the member 43 is moved within the member 34, so that the splined portions of each engage. The member 43 is moved to its engaging or disengaging positions through suitable linkages, generally indicated at 44, by means such as a Bowden cable 45 passing through the dashboard of the vehicle and controlled by a suitable knob 46 thereon.

The countershaft transmission 20 is a conventional unit containing a plurality of gears to provide a plurality of speed drives between the input shaft 10 and the output shaft 11.

The shifting of the gears in the countershaft transmission 20 is accomplished by means of the usual fork mechanism controlled by the vehicle shift lever 47 (see Figure 2) through a shift lever rod 48 mounted adjacent to the steering column 49 of the vehicle, a link 50 mounted on the shift lever rod 48, a rod 51 attached at one end to the link 50 through an elongated slot 50a and at the other end to a link 52 which link 52 controls the aforementioned fork arrangement. This shifting linkage arrangement provides for a lost motion effect for a purpose to be described.

Figure 2:
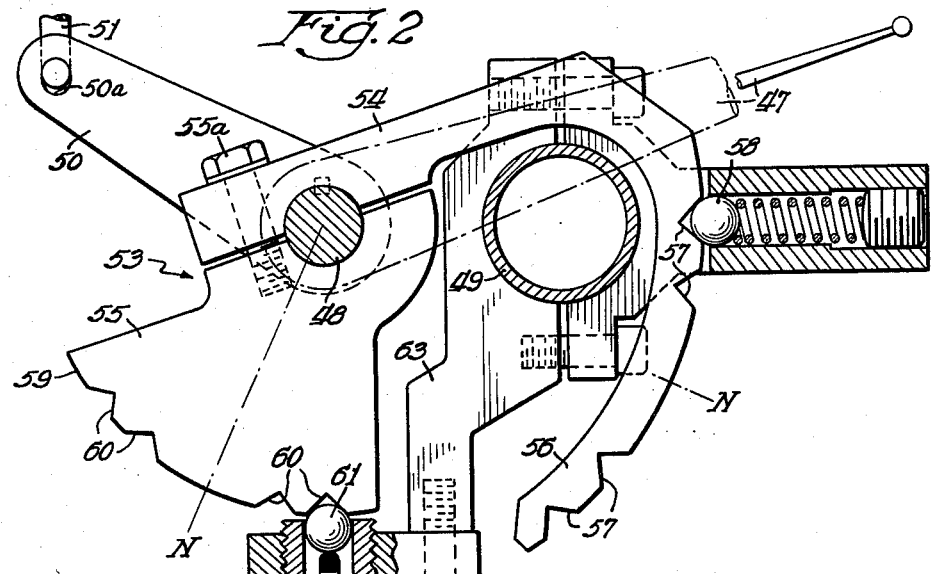
Figure 2 is a view, with some parts in section, showing the manually operated control elements associated with the transmission of Figure 1 and showing a diagram of an electrical circuit associated therewith.

Particular attention is now directed to Figure 2 wherein there is illustrated the conventional shift lever 47 attached to the shift rod 48 adjacent the steering column 49 of the vehicle. A two-piece bracket, generally indicated at 53 and comprising a first part 54 and a second part 55 is attached by suitable means, such as a bolt 55a, to the shift rod 48. By such attachment, the two-piece bracket 55 is adapted to be rotated by rotation of the shift rod 48 by means of the shift lever 47.

The first portion 54 of the bracket 53 is provided with an arcuate finger-like portion 56 having a plurality of detents 57 corresponding to the particular gear ratio selected in the countershaft transmission 20, and a position "N" for neutral. A spring pressed detent ball 58 is adapted to be positioned in one of the detents depending upon the particular gear ratio selected for the purpose of resiliently holding the shift lever and the shift rod in the desired selected position.

The second portion 55 of the bracket 53 is provided with an arcuate surface 59 which is also provided with a plurality of detents 60, each of which corresponds to a particular gear ratio selected by the shift lever 47 in the countershaft transmission 20, and also a neutral position "N." A spring pressed detent ball 61 is adapted to be positioned in one of the detents 60 depending upon the particular gear ratio selected by means of the shift lever 47.

The spring pressed detent ball 61 is carried in a housing member 62 fixed with respect to the steering column 49 by means of a bracket 63. A switch member 64 provided with a stem portion 65 abutting the ball 61 is interposed between a spring 66 and the detent ball 57. The spring resiliently urges the switch member to its illustrated position and the detent ball into detent-engaging position. The switch member 64 is adapted to contact a pair of electrical contacts 67 and 68, so as to complete an electrical circuit therebetween, when the switch member 64 and the ball 61 are depressed against the spring 66, such depression occurring between shifts of the shift lever 47 and when the detent ball 61 rides on the arcuate surface 59 of the bracket member 55. The contact 67 is connected to one side of the vehicle battery through the usual vehicle ignition switch 69 and the contact 68 is connected to a solenoid 70, which solenoid is connected to the other side of the vehicle battery through ground. Upon completing the electrical circuit, by connecting the contacts 67 and 68, the solenoid 70 will be energized as hereinafter described.

Figure 3:
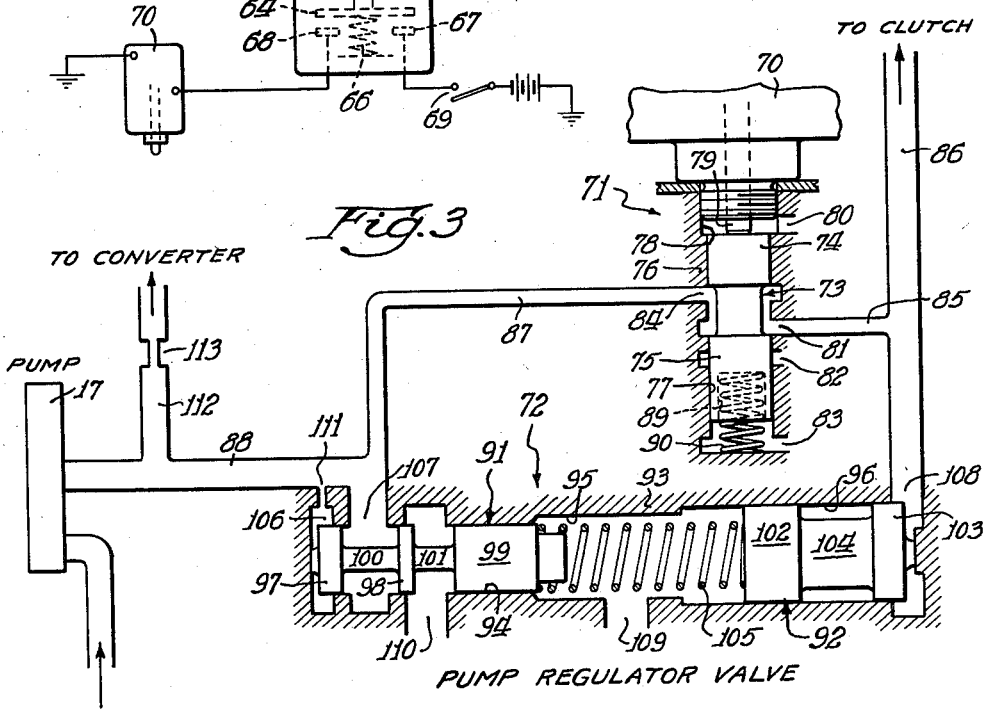
Figure 3 is a diagram of a hydraulic control system constructed in accordance with this invention.

Attention is now directed to Figure 3 showing the hydraulic circuit for controlling the operation of the clutch 18 shown in Figure 1. This hydraulic control circuit comprises, in general, the pump 17, the solenoid 70, a selector valve 71 operated by the solenoid 70, and a pump regulating valve 72.

The selector valve 71 comprises a piston 73 having a pair of lands 74 and 75, spaced by a groove, slidably disposed in a casing portion 76. The casing portion 76 is provided with two connected cylindrical cavities 77 and 78 of successively increasing diameters and the piston 73 is slidably disposed within the cavity 77. A piston-like member 79 connected to the solenoid 70 is slidably disposed in the cavity 78 and passes through an open end of the casing portion 76 and abuts the piston 73, so that upon energization of the solenoid, the piston 73 will be moved downwardly within the cavity 77. The casing portion 76 is provided with ports 80, 81, 82, 83 and 84. The ports 80, 82 and 83 are ports which freely discharge into the sump. The port 81 is connected to a conduit 85, which is connected to a conduit 86, and the conduit 86 is connected at one end to the conduit 42 for supplying fluid to the cavity 38 to engage the clutch 18. The port 84 is connected to a conduit 87, which is connected to a conduit 88 leading from the discharge port (not shown) of the pump 17. The piston 73 is provided with an internal bore 89 which receives a coiled compression spring 90 to resiliently urge the piston 73 to its upper position and in the opposite direction to the movement of the piston member 79 of the solenoid 70.

The pump regulator valve 72 comprises pistons 91 and 92 slidably disposed in a casing portion 93. The casing portion 93 is provided with three cylindrical cavities 94, 95 and 96 of successively increasing diameters, and the piston 91 is slidably disposed in the cavity 94, and the piston 92 is slidably disposed in the cavity 96. The piston 91 has lands 97, 98 and 99 and grooves 100 and 101 between the lands. The piston 92, as shown, has lands 102 and 103 and a groove 104 between the lands. The pistons 91 and 92 are provided with reduced diameter tip portions to space them from the adjacent walls of their respective cavities. A compression spring 105 is provided between the pistons 91 and 92.

The casing portion 93 is provided with ports 106, 107, 108, 109 and 110. The port 106 is connected through a restriction 111 to the conduit 88 which is connected to the discharge port of the pump 17; the port 107 is also connected to the conduit 88; the port 108 is connected to the other end of the conduit 86; and the ports 109 and 110 are ports discharging freely into the sump.

A branch conduit 112 provided with a restriction 113 is connected to the conduit 88, so as to feed the torque converter 16 with fluid under pressure, the restriction 113 providing a proper pressure drop to the torque converter.

When the ignition switch 69 is closed and the shift lever 47 is in its neutral or "N" position, the switch member 64 is also closed and the solenoid 70 is energized. The armature 79 of the energized solenoid valve 71 forces the piston 73 downward against the action of the spring 90 into a position where the land 74 blocks the port 84. The piston 91 of the pump regulator valve 72 maintains the pressure of the fluid from the discharge port of the pump 17 at a predetermined maximum pressure which is relatively low, for example, 20 pounds per square inch. The fluid under pressure from the pump 17 is applied to the left hand face of the land 97 of the piston 91 through the restriction 111, and this fluid functions to move the piston 91 to the right against the action of the spring 105, so as to provide an egress for the fluid discharged from the pump 17. This fluid under pressure also flows to the port 107, and the egress is provided between the land 98 and the left edge of the port 110. A greater fluid pressure will tend to move the valve piston 91 farther to the right to relieve a greater amount of fluid between the land 98 and the left edge of the port 110, while a lower fluid pressure will allow the spring 105 to move the piston 91 to the left to close the crack between the land 98 and the left edge of the port 110 to reduce the release of fluid, the net result being a stabilization of the fluid pressure within the connected conduits 88 and 87 at a predetermined maximum by means of the valve piston 91. The piston 92 remains in its illustrated position under these conditions.

Under the above described conditions, the solenoid 70 will be energized, since the switch member 64 will be in engagement with the contacts 67 and 68 and the electrical circuit will thus be completed. When the solenoid 70 is energized, the piston-like member 79 will be moved downwardly, and will move the piston 73 of the selector valve 71 downwardly against the force of the spring 90. Thus, the port 84 is blocked by the land 74 and fluid under pressure in the conduit 87 (if the pump is being driven) cannot flow to engage the clutch 18. Also, the ports 81 and 82 are connected, so that fluid in the clutch chamber 38 and the connected conduits 42, 86 and 85 will be exhausted to the sump through the ports 81 and 82, and the spring 39 will be effective to move the clutch piston 36 to clutch disengaging position to disengage the clutch 18.

The shift lever 47 is moved to shift the gears in the countershaft transmission 20 to start the vehicle in motion and to upshift the transmission in the usual manner, and with such movement, the detent balls 58 and 61 will be positioned in one of the detents 57 and 60, respectively, corresponding to the particular gear ratio selected. When the detent ball 61 is positioned in a detent 60, the spring 66 will move the switch member 64 out of contact with the contacts 67 and 68, breaking the electrical circuit to the solenoid 70 and de-energizing the solenoid. When this occurs, the piston-like member 79 will move upwardly and the spring 90 will return the piston 73 to its illustrated position, so that the ports 84 and 81 will be connected by the groove between the lands 74 and 75 and fluid pressure in the conduit 87 will then flow through the ports 84 and 81, into the conduits 85 and 86 to the conduit 42, and into the clutch cavity 38 moving the piston 36 against the force of the spring 39 and causing engagement of the clutch 18. With the clutch 18 engaged and the countershaft transmission 20 in one of its gear ratios, a drive between the shafts 10 and 11 will be completed.

As has been previously described, the pump regulating valve 72 maintains pressure in the conduits 88 and 87 at some relatively low value, such as 20 lbs. per sq. in. and this value of fluid pressure is utilized for engaging the clutch 18. This relatively low value of fluid pressure in the fluid supply conduit 88 and, also, the fluid supply conduits 86 and 42 to the clutch cavity 38 is just sufficient to engage the clutch 18 and hold the engaging parts against the input torque transmitted through the hydraulic torque converter 16 and to stop the engaging parts from rotation relative to each other, assuming that the vehicle accelerator (not shown) is in a released closed throttle position. Since this low value of engaging pressure is used, the engagement of the clutch 18 is gradual, so that the engagement is not too noticeable to the vehicle driver.

The relatively low pressure fluid also flows from the conduit 86 to the port 108 and acts on the piston 92 of the valve 72. The fluid pressure moves the piston 92 to the left against the action of the spring 105 until the piston strikes the edge of the adjacent smaller cavity 95 to prevent its further movement. The spring 105 is compressed and acts on the piston 91 to move the piston 91 to the left in the cavity 94 tending to close the port 110 by means of the land 98. The pressure in the conduit 88 and connected conduits must therefore build up to a higher value, such as 80 lbs. per sq. in., in order that it may be effective to move the valve piston 91 again into its fluid pressure regulating position, cracking open the port 110.

The valve piston 91 regulates the pressure in the supply conduit 88 as before, but, due to the action of the piston 92 compressing the spring 105, the pressure in the conduit is at the higher value, such as 80 lbs. per sq. in., which is sufficient to maintain the clutch 18 engaged with sufficient intensity, so that there is no clutch slippage as the engine throttle is opened and greater power is transmitted by the vehicle engine with torque conversion in the torque converter 16.

With the pressure in the conduit 88 being at its higher value sufficient for completing the power train through the transmission with the vehicle engine supplying torque under open throttle condition, the pressure within the torque converter 16 is coordinately increased to a value sufficient for transmitting the increased engine torque through the converter. However, the fluid passes through the restriction 113 thereby providing a proper pressure drop, so that the pressure supplied to the converter 16 will not have an excessive value.

The lost motion linkage 50, 50a, 51, and 52 between the shift lever rod 48 and the fork (not shown) of the countershaft transmission 20 allows the switch bar 64 to close against the contacts 67 and 68 so as to energize the solenoid valve 71. The energized valve 71 opens the port 82 to the port 81 through the groove of the valve piston 73 and the servo motor cavity 38 is allowed to drain so that the clutch 18 is fully disengaged before shifting to another gear ratio. The lost motion linkage thus provides a brief time delay in which the servo motor cavity 38 can drain before a shift is made into another gear ratio. The operation of the control circuit is the same when changing from any one of the gear ratios to another, and, when it is desired to shift gears in the countershaft transmission, it is only necessary to move the shift lever 47 to its proper position.

The aforementioned operation of the vehicle necessarily depends upon the vehicle ignition system being "On," i.e., with the ignition switch 69 closed, and the vehicle engine operating; the solenoid 70 is electrically operated and the pump 17 which supplies fluid pressure to the control circuit is driven by the impeller 21 of the torque converter 16 which is connected to the engine output shaft.

At times, as when the vehicle battery is in a run-down condition, it is impossible to start the vehicle engine by means of the ignition system, and it is necessary to push the vehicle so as to start the engine. In such a case, it is only necessary to turn the ignition system "On," place the vehicle in gear, i.e., select a gear ratio in the countershaft transmission 20, pull the Bowden cable 45, so as to move the member 43 to engage the splined portion thereof with the splined portion 35 of the member 34, thereby engaging the push start clutch 19. Engagement of the clutch 19 allows the motion imparted to the driven shaft 11 to be transmitted to the vehicle engine through the shaft 10, so that the engine will turn over and start.

Thus, this invention provides a clutch which is automatically operated concurrently with a change in the shift lever position, eliminating the usual vehicle clutch pedal and providing for a smooth gear change, together with a provision for push-starting the vehicle, when necessary or desirable.

While this invention has been described in connection with one specific embodiment thereof, it is to be understood that this is by way of illustration and not by way of limitation and the scope of this invention is defined solely by the appended claims which should be construed as broadly as the prior art will permit.

We claim:

1. In transmission mechanism, the combination of a drive shaft, an intermediate shaft, a friction clutch for connecting said shafts, fluid pressure actuated means for operating said clutch, a driven shaft, a transmission providing a plurality of different drives connecting said intermediate and driven shaft, a control element for changing the drives through said transmission, a source of fluid under pressure, means under the control of said control element for effectively changing a connection between said source of fluid and said fluid pressure actuated means for disengaging said clutch when said control element is moved in a direction to change the drive through the transmission, and means under the control of said control element for maintaining the fluid from said source at a predetermined high pressure prior to movement of said control element and for changing the said fluid pressure from said source to a predetermined low pressure when said control element is moved to change the drive.

2. In transmission mechanism, the combination of a drive shaft, an intermediate shaft, a friction clutch for connecting said shafts, fluid pressure actuated means for operating said clutch, a drive shaft, a transmission providing a plurality of different drives connecting said intermediate and said driven shafts, a control element movable for changing the drives through said transmission, a source of fluid under pressure, a selector valve under the control of said control element and movable from one position to supply fluid pressure from said source to said fluid pressure actuated means for causing engagement of said clutch to another position blocking flow of fluid from said source to said fluid pressure actuated means and allowing disengagement of said clutch when said control element is moved in a direction to change the drive, and a regulator valve under the control of said control element maintaining the fluid pressure from said source at a predetermined high pressure prior to movement of said control element and for changing the fluid pressure from said source to a predetermined low pressure when said control element is moved to change the drive.

3. In transmission mechanism, the combination of a drive shaft, an intermediate shaft, a friction clutch for connecting said shafts, fluid pressure actuated means for operating said clutch, a driven shaft, a transmission providing a plurality of different drives connecting said intermediate and said driven shafts, a control element movable for changing the drives through said transmission, an electrically operated solenoid under the control of said control element and being energizing when said control element is moved to change the drive, a source of fluid under pressure, a selector valve under the control of said solenoid and movable from one position to supply fluid pressure from said source to said fluid pressure actuated means to cause engagement of said clutch to another position blocking the supply of fluid pressure to said fluid pressure actuated means, for allowing disengagement of said clutch when said solenoid is energized, a regulator valve under the control of said control element for maintaining the fluid pressure from said source at a predetermined high pressure prior to movement of said control element and for changing the fluid pressure from said source to a predetermined low pressure when said control element is moved to change the drive, and means connected between said control element and said transmission for providing a time lag between a disengagement of said clutch and a change of drive in said transmission.

4. In transmission mechanism, the combination of a drive shaft, an intermediate shaft, a friction clutch for connecting said shafts, fluid pressure actuated means for operating said clutch, a drive shaft, a transmission providing a plurality of different drives connecting said intermediate and said driven shafts, a control element for changing the drives through said transmission, a source of fluid under pressure, a selector valve under the control of said control element and movable from one position to supply fluid pressure from said source to said fluid pressure actuated means for causing engagement of said clutch to another position blocking the supply of fluid to said fluid pressure actuated means allowing disengagement of said clutch when said control element is moved in a direction to change the drive, a regulator valve under the control of said control element for maintaining the fluid pressure from said source at a predetermined high pressure prior to movement of said control element and for changing the said fluid pressure from said source to a predetermined low pressure when said control element is moved to change the drive, and lost motion linkage connecting said transmission and said control element for providing a time lag between a disengagement of said clutch and a change of drive in said transmission.

5. In transmission mechanism, the combination of a drive shaft, an intermediate shaft, a friction clutch for connecting said shafts, fluid pressure actuated means for operating said clutch, a driven shaft, a transmission providing a plurality of different drives connecting said intermediate and said driven shafts, a control element movable for changing the drives through said transmission, an electrically operated solenoid under the control of said control element and being energizing when said control element is moved in a direction to change the drive, a source of fluid under pressure, a selector valve under the control of said solenoid and movable from one position to supply fluid pressure from said source to said fluid pressure actuated means to cause engagement of said clutch to another position blocking the supply of fluid to said fluid pressure actuated means for allowing disengagement of said clutch when said solenoid is energized, a regulator valve under the control of said control element for maintaining the fluid presure from said source at a predetermined high pressure prior to movement of said control element and for changing the fluid pressure to a predetermined low pressure when said control element is moved to change the drive, means connected between said control element and said transmission for providing a lag between a disengagement of said clutch and a change of drive in said transmission, and a manually operated second clutch in parallel with said friction clutch to allow connection of said drive shaft and said intermediate shaft when said source of fluid pressure is inoperative.

6. In transmission mechanism, the combination of a drive shaft, an intermediate shaft, a friction clutch for connecting said shafts, fluid pressure actuated means for operating said clutch, a driven shaft, a transmission providing a plurality of different drives connecting said intermediate and said driven shafts, a control element movable for changing the drives through said transmission, a source of fluid under pressure, means under the control of said control element for effectively changing a connection between said source of fluid and said fluid pressure actuated means, for disengaging said clutch when said control element is moved in a direction to change the drive through the transmission, and a regulator valve under the control of said control element comprising a first piston and a second piston, said pistons being movable in response to fluid pressure being applied thereto, a spring disposed between said pistons and opposing said movement, means to apply fluid from said source to said first piston for moving said first piston and providing a drain for said fluid for maintaining the fluid pressure from said source at a predetermined low pressure, means to apply fluid pressure to said second piston to move said second piston and to reinforce said spring so that a higher fluid pressure is required to move said first piston to provide said drain for maintaining said fluid pressure source at a predetermined high pressure and means interconnecting said control element and said second piston so that said fluid pressure is applied to said second piston to so increase the fluid pressure when said control element is moved to change the transmission drive.

7. In transmission mechanism, the combination of a drive shaft, an intermediate shaft, a friction clutch for connecting said shafts, fluid pressure actuated means for operating said clutch, a drive shaft, transmission providing a plurality of different ratio drives connecting said intermediate and said driven shafts, means including a lost motion linkage for changing the ratio drive in said transmission, means including a pump driven by said drive shaft providing a source of fluid under pressure, a selector valve for controlling said fluid pressure actuated means and under the control of said drive changing means, said selector valve being movable for connecting and disconnecting said source of fluid from said fluid pressure actuated means when said ratio changing means is moved to change the ratio drive in said transmission, and valve means for regulating the pressure of said fluid pressure from said source to provide a predetermined low pressure when said clutch is disengaged and to provide a predetermined high pressure for maintaining said clutch engaged prior to a change in said drive ratio, said lost motion linkage allowing said change in said drive ratio to be made after a disengagement of said clutch.

8. In transmission mechanism, the combination of a drive shaft, an intermediate shaft, a friction clutch for connecting said shafts, fluid pressure actuated means for operating said clutch, a drive shaft, transmission providing a plurality of different ratio drives connecting said intermediate and said driven shafts, control means including a lost motion linkage for changing the ratio drive in said transmission, a solenoid under the control of said control means and energized when said change in ratio drive is being made, means including a pump driven by said drive shaft providing a source of fluid under pressure, a selector valve for controlling said fluid pressure actuated means, and under the control of said solenoid, said selector valve being movable for connecting and disconnecting said source of fluid from said fluid pressure actuated means when said solenoid is energized, and means for regulating the fluid pressure from said source to provide a predetermined low pressure when said clutch is disengaged and to provide a predetermined high pressure for maintaining said clutch engaged prior to a movement of said selector valve to disconnect said pressure source and said clutch, said lost motion linkage allowing said change in said drive ratio to be made after a disengagement of said clutch.

References Cited in the file of this patent
UNITED STATES PATENTS

| | | |
|---|---|---|
| 2,153,509 | Rockwell | Apr. 4, 1939 |
| 2,645,137 | Roche | July 14, 1953 |
| 2,682,787 | Holdeman | July 6, 1954 |
| 2,689,029 | McFarland | Sept. 14, 1954 |
| 2,756,616 | Forster | July 31, 1956 |
| 2,756,851 | Collins | July 31, 1956 |

Disclaimer 2,939,557.—*Sam Dabich* and *John B. Polomski*, Detroit, Mich. TRANSMISSION MECHANISM. Patent dated June 7, 1960. Disclaimer filed Aug. 26, 1964, by the assignee, *Borg-Warner Corporation*.

Hereby enters this disclaimer to claims 1 and 2 of said patent.

[*Official Gazette December 1, 1964.*]